United States Patent
Moon et al.

(10) Patent No.: US 10,313,935 B2
(45) Date of Patent: *Jun. 4, 2019

(54) METHOD AND APPARATUS FOR CONTROLLING WAITING TIME FOR DETERMINATION OF RADIO LINK FAILURE IN WIRELESS COMMUNICATION SYSTEM

(71) Applicant: Samsung Electronics Co., Ltd., Suwon-si, Gyeonggi-do (KR)

(72) Inventors: Jung-Min Moon, Suwon-si (KR); Anshuman Nigam, Bangalore (IN); Jung-Soo Jung, Seongnam-si (KR); Sun-Heui Ryoo, Yongin-si (KR); Sung-Jin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,219

(22) Filed: Feb. 1, 2018

(65) Prior Publication Data

US 2018/0160343 A1 Jun. 7, 2018

Related U.S. Application Data

(63) Continuation of application No. 14/663,926, filed on Mar. 20, 2015, now Pat. No. 9,924,419.

(30) Foreign Application Priority Data

Mar. 21, 2014 (KR) .................. 10-2014-0033479

(51) Int. Cl.
  *H04W 76/18* (2018.01)
  *H04W 76/19* (2018.01)
  (Continued)

(52) U.S. Cl.
  CPC ....... *H04W 36/0072* (2013.01); *H04W 76/18* (2018.02); *H04W 76/38* (2018.02);
  (Continued)

(58) Field of Classification Search
  CPC ................................................ H04W 36/0072
  (Continued)

(56) References Cited

U.S. PATENT DOCUMENTS

| 6,587,441 B1 * | 7/2003 | Urban | H04L 1/1867 370/310 |
| 9,107,102 B2 * | 8/2015 | Jung | H04W 24/08 |

(Continued)

FOREIGN PATENT DOCUMENTS

| CN | 101132611 A | 2/2008 |
| EP | 2387271 A1 | 11/2011 |
| WO | 2014/010892 A1 | 1/2014 |

OTHER PUBLICATIONS

Ericsson; Fast RLF recovery with new Handover-RLF timer; 3GPP TSG-RAN WG2 #85; Tdoc R2-140558; Feb. 10-14, 2014; Prague, Czech Republic.

(Continued)

*Primary Examiner* — Santiago Garcia

(74) *Attorney, Agent, or Firm* — Jefferson IP Law, LLP

(57) ABSTRACT

A method and an apparatus for controlling a waiting time related to determination of a radio link failure in a wireless communication system are provided. The method includes receiving a message from a network, if a first timer for determination of the radio link failure is running and the message includes timer information related to the waiting time, starting a second timer related to the waiting time based on the timer information, and if the second timer (Continued)

expires before expiration of the first timer, determining a channel situation of a serving cell as a situation of the radio link failure.

16 Claims, 13 Drawing Sheets

(51) Int. Cl.
 *H04W 36/30* (2009.01)
 *H04W 36/00* (2009.01)
 *H04W 76/38* (2018.01)
(52) U.S. Cl.
 CPC .......... *H04W 36/30* (2013.01); *H04W 36/305* (2018.08); *H04W 76/19* (2018.02)
(58) Field of Classification Search
 USPC ........................................................ 455/437
 See application file for complete search history.

(56) References Cited

U.S. PATENT DOCUMENTS

| | | | | |
|---|---|---|---|---|
| 9,220,124 | B2* | 12/2015 | Wegmann | H04W 76/19 |
| 2010/0173626 | A1 | 7/2010 | Catovic et al. | |
| 2010/0195507 | A1* | 8/2010 | Marinier | H04L 1/20 |
| | | | | 370/242 |
| 2010/0240359 | A1* | 9/2010 | Wu | H04W 24/00 |
| | | | | 455/424 |
| 2011/0019532 | A1 | 1/2011 | Jung et al. | |
| 2011/0021154 | A1* | 1/2011 | Marinier | H04W 72/02 |
| | | | | 455/67.11 |
| 2011/0124340 | A1* | 5/2011 | Puttonen | H04W 36/0083 |
| | | | | 455/437 |
| 2011/0170516 | A1* | 7/2011 | Hu | H04W 36/0033 |
| | | | | 370/331 |
| 2011/0243102 | A1* | 10/2011 | Sebire | H04W 56/0045 |
| | | | | 370/336 |
| 2011/0317544 | A1* | 12/2011 | Chou | H04L 41/0681 |
| | | | | 370/216 |
| 2013/0023302 | A1 | 1/2013 | Sivanesan et al. | |
| 2013/0034013 | A1* | 2/2013 | Jung | H04W 24/08 |
| | | | | 370/252 |
| 2013/0121161 | A1* | 5/2013 | Szabo | H04L 43/0876 |
| | | | | 370/241 |
| 2013/0182563 | A1* | 7/2013 | Johansson | H04W 76/18 |
| | | | | 370/228 |
| 2013/0183974 | A1 | 7/2013 | Johansson et al. | |
| 2013/0295939 | A1* | 11/2013 | Wegmann | H04W 76/19 |
| | | | | 455/436 |
| 2014/0080490 | A1* | 3/2014 | Bergstrom | H04W 56/0005 |
| | | | | 455/437 |
| 2014/0274006 | A1* | 9/2014 | Mutya | H04W 36/14 |
| | | | | 455/416 |
| 2014/0293903 | A1* | 10/2014 | Kuo | H04W 24/02 |
| | | | | 370/329 |
| 2015/0057002 | A1* | 2/2015 | Lee | H04W 36/06 |
| | | | | 455/437 |
| 2015/0195758 | A1 | 7/2015 | Kim et al. | |
| 2015/0223136 | A1* | 8/2015 | Gao | H04W 76/38 |
| | | | | 455/436 |
| 2015/0304891 | A1* | 10/2015 | Dinan | H04W 76/27 |
| | | | | 370/331 |

OTHER PUBLICATIONS

Ericsson et al.; Fast RLF recovery; 3GPP TSG-RAN WG2 Meeting #85; R2-140923; Feb. 10-14, 2014; Prague czech Republic.
Samsung; "Early RLF Recovery"; 3GPP TSG-RAN WG2 Meeting #85; R2-140344; Feb. 10-14, 2014, Prague, Czech.
Samsung; "Minor Corrections to T312"; 3GPP TSG-RAN WG2 Meeting #85bis; R2-141520; Mar. 31-Apr. 4, 2014, Valencia, Spain.
Chinese Office Action dated Mar. 4, 2019; Chinese Patent Application No. 201580026113.1.
Japanese Office Action dated Jan. 11, 2019; Japanese Patent Application No. 2016-557573.

* cited by examiner

METHOD AND APPARATUS FOR CONTROLLING WAITING TIME FOR DETERMINATION OF RADIO LINK FAILURE IN WIRELESS COMMUNICATION SYSTEM

CROSS-REFERENCE TO RELATED APPLICATION(S)

This application is a continuation application of prior application Ser. No. 14/663,926, filed on Mar. 20, 2015, which claimed priority under 35 U.S.C. § 119(a) of a Korean patent application filed on Mar. 21, 2014 in the Korean Intellectual Property Office and assigned Serial number 10-2014-0033479, the entire disclosure of each of which is hereby incorporated by reference.

TECHNICAL FIELD

The present disclosure relates to a method and apparatus for controlling an operation of a timer related to Radio Link Failure (RLF) in relation to handover in a wireless communication system.

BACKGROUND

In a wireless communication system, the channel status to a serving cell is generally changed from time to time depending on the movement or communication environment of a User Equipment (UE), and if the channel status of the serving cell is not good, the UE may declare Radio Link Failure (RLF) to perform Radio Resource Control (RRC) connection reconfiguration, or may detect (or search for) a target cell for handover among the neighboring cells to perform a handover procedure.

First, a handover procedure in a Long Term Evolution (LTE) system that is an example of the wireless communication system will be described.

FIG. 1 illustrates a handover procedure in an LTE system according to the related art. Herein, the LTE system may include a 3$^{rd}$ Generation Partnership Project (3GPP) LTE-Advanced (LTE-A) system.

Referring to FIG. 1, in operations 101 to 107, if a UE 110 detects a handover event by measuring the strength (e.g., Reference Signal Received Power (RSRP)) of a downlink signal, the UE 110 may report the result to a serving evolved Node B (eNB) 130 of a serving cell, using a measurement report message. In operations 109 to 119, the serving eNB 130 may determine whether to perform handover, and request handover from a target eNB 150 of a target cell to which the UE 110 is to be handed over. The target eNB 150 may determine whether to admit handover of the UE 110 by performing admission control. If handover of the UE 110 is admitted, the serving eNB 130 may transmit the information used to perform handover to the UE 110, using a handover command message. In operations 121 to 127, the UE 110 may perform a handover procedure to the target eNB 150, using the information included in the handover command message, and the UE 110 may terminate the handover procedure after sending a handover confirm message to the target eNB 150. Referring to FIG. 1, reference numerals 11, 13 and 15 represent individual intervals determined by dividing the handover procedure. Reference numeral 11 represents a Time To Trigger (TTT) interval in which handover is triggered, and the TTT interval may be maintained while a handover timer TTT is running.

Generally, in the wireless communication system, handover may occur if the signal strength of the target eNB is greater than the signal strength of the serving eNB, meaning that the UE is located at the edge of the serving cell or a channel gain between the UE and the serving eNB is low. Therefore, the handover that occurs because the signal strength of the target eNB is higher than the signal strength of the serving eNB, and the RLF that occurs because the channel gain between the UE and the serving eNB is low, are highly likely to occur together. In the LTE system, the handover and the RLF are defined through the conditions in the following Table 1.

TABLE 1

|  | Conditions | Condition maintaining time (timer) |
|---|---|---|
| Handover | $RSRP_{target} > RSRP_{serving} + \Delta$ | TTT (time-to-trigger) |
| RLF | '$BLER_{PDCCH} < BLER_{threshold}$' has occurred N310 times (out-of-sync indication is received N310 times) | T310 |

In Table 1, "N310" is set to a predetermined number of times. As shown in Table 1, if the handover and RLF conditions are maintained for a specified time (e.g., timer TTT, and T310), the handover and RLF may be declared and an operation related thereto may be performed. If the handover and RLF conditions haven't been maintained for the specified time even though the handover and RLF conditions are satisfied, the conditions that have already occurred may be invalid.

Basically, the handover and the RLF may be the processes that are operated independently. Therefore, if the RLF is declared while the handover procedure is performed, the UE may perform RRC connection reconfiguration regardless of the remaining handover procedure. The handover and the RRC connection reconfiguration may cause service disconnection while performing the following operations, respectively.

TABLE 2

|  | Operations |
|---|---|
| Handover | Downlink synchronization → uplink synchronization → resource allocation |
| RRC connection reconfiguration | Cell search → downlink synchronization → system information acquisition → uplink synchronization → resource allocation |

As shown in Table 2, the RRC connection reconfiguration, compared with the handover, uses additional time for cell search and system information acquisition. Generally, the cell search and the system information acquisition are operations using a longer time than downlink synchronization, uplink synchronization, and resource allocation. Therefore, it can be noted that when the UE desires to perform communication with a new eNB by performing handover or RRC connection reconfiguration by RLF, the handover is advantageous over the RRC connection reconfiguration in terms of the service disconnection time.

In a heterogeneous network including various types of cells, the frequency of co-occurrence of the handover and the RLF has increased due to the introduction of small cells. The reason is as follows. First, the small cell has a small cell coverage area. If the small cells are installed at a high density, the UE may detect multiple small cells and may be subject to interference from them. Therefore, the number of handover areas may increase, and the number of areas where the RLF condition is satisfied due to the inter-cell interference may also increase. To cope with this, an operation of considering the handover and the RLF at the same time has been proposed recently. Details thereof are as follows.

FIG. 2 illustrates a scheme for early termination of an RLF timer in an LTE system according to the related art.

Referring to FIG. 2, while an RLF timer T310 is running, if a handover timer TTT is started, maintained and terminated (or expired), the UE may terminate the RLF timer early upon expiration of the handover timer TTT as shown by reference numeral 201, without waiting for the remaining time of the RLF timer until the end, and then perform RRC connection reconfiguration.

As described above, the RLF may occur when the channel gain between the UE and the serving eNB is low, and the RLF may be determined by a Block Error Rate (BLER) of a Physical Downlink Control Channel (PDCCH). Therefore, referring to FIG. 2, the early termination technique for an RLF timer is to terminate the RLF timer early to reduce the waiting time that is unnecessary in performing RRC connection reconfiguration, determining that the UE is highly unlikely to successfully receive a handover command message from the serving eNB since the RLF timer of the UE has been started.

However, the reason why the UE uses (or runs) the RLF timer without directly declaring the RLF is that the channel gain might be likely to get better again during the RLF timer. For this reason, in the early termination technique for an RLF timer according to the related art, the UE may not monitor the situation where the channel gain of the serving cell gets better again. In addition, since the UE performs RRC connection reconfiguration at all times after terminating the RLF timer early, the RLF may undergo a more complex procedure, compared with the RLF which may be automatically recovered.

In addition, the fact that the RLF timer is running means that the channel gain between the UE and the serving eNB is very low on average, but the instantaneous channel gain might be likely to be high by fast fading. If this possibility is taken into consideration, even though the RLF timer is running, the UE is likely to successfully receive a handover command message and successfully perform handover. Therefore, quickly performing RRC connection reconfiguration at all times like in the early termination technique of the related art for an RLF timer T310 may not be considered the best solution.

Therefore, in order to address the disadvantages of the early termination technique for an RLF timer, a new timer called a T312 timer has been introduced. For convenience, the T312 timer will be referred to herein as a waiting timer. The technique for utilizing a waiting timer T312 may operate as follows.

FIG. 3 illustrates an operation of a proposed waiting timer T312 in an LTE system according to the related art.

Referring to FIG. 3, while the RLF timer T310 is running, if the handover timer TTT is started, and then terminated at time 301, the UE may perform a handover procedure during the waiting timer T312, and if the waiting timer T312 is terminated at time 303, the UE may terminate the RLF timer early without waiting for the remaining time of the RLF timer until the end, and then perform RRC connection reconfiguration. The technique for a waiting timer T312 in FIG. 3 has been provided by partially improving the early termination technique for an RLF timer, which has been described in FIG. 2.

The early termination technique for an RLF timer in FIG. 2 has not considered the possibility that the channel gain will be recovered again, and the possibility that the UE will successfully receive a handover command message since the instantaneous channel gain is high even though the overage channel gain is low. However, by introducing the waiting timer T312 as shown in FIG. 3, the UE may monitor whether the channel gain is recovered or the handover is successfully performed during the waiting timer T312, even after the handover timer TTT is terminated. In addition, if the waiting timer T312 is terminated, the UE may terminate the RLF timer early, and then perform RRC connection reconfiguration, thus making it possible to prevent the increase in the service disconnection time of the UE.

However, as to the technique for a waiting timer T312, there are no specific proposed measures for determining by which scheme the UE will operate the waiting timer T312 in various situations which may occur in the network. Therefore, the measures to control the waiting timer T312 more efficiently are desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for efficiently controlling a waiting time for determination of a Radio Link Failure (RLF) in a wireless communication system.

Another aspect of the present disclosure is to provide a method and apparatus for efficiently controlling an operation of a waiting timer upon determination of an RLF in a wireless communication system.

In accordance with an aspect of the present disclosure, a method for controlling a waiting time related to determination of an RLF in a wireless communication system is provided. The method includes receiving a message from a network, if a first timer for determination of the RLF is running and the message includes timer information related to the waiting time, starting a second timer related to the waiting time based on the timer information, and if the second timer expires before expiration of the first timer, determining a channel situation of a serving cell as a situation of the RLF.

In accordance with another aspect of the present disclosure, a User Equipment (UE) for controlling a waiting time related to determination of an RLF in a wireless communication system is provided. The UE includes a transceiver configured to transmit and receive data to/from a network, and a controller configured to control operations of, if a first timer for determination of the RLF is running and the message includes timer information related to the waiting time, starting a second timer related to the waiting time based on the timer information, and if the second timer expires before expiration of the first timer, determining a channel situation of a serving cell as a situation of the RLF.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
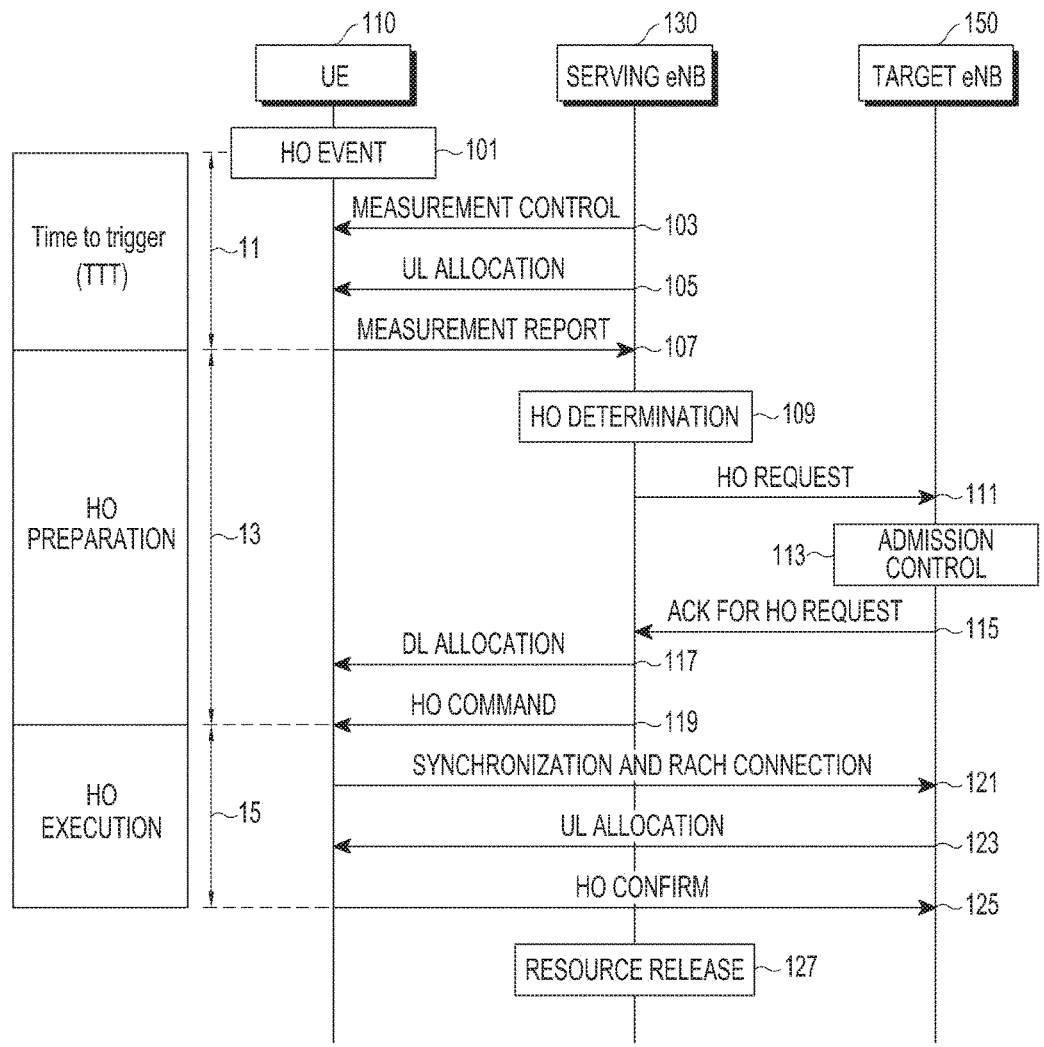
FIG. 1 illustrates a handover procedure in a Long Term Evolution (LTE) system according to the related art.
Figure 2:
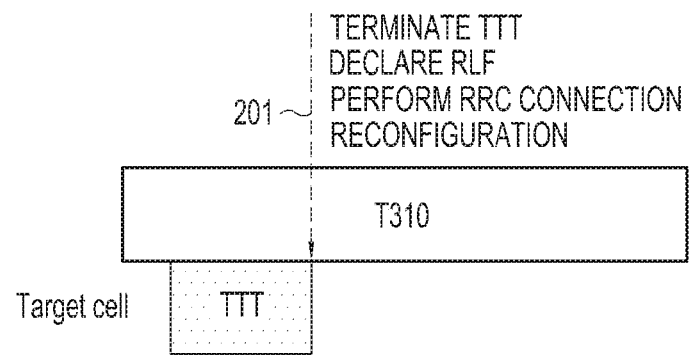
FIG. 2 illustrates a scheme for early termination of a Radio Link Failure (RLF) timer in an LTE system according to the related art.
Figure 3:
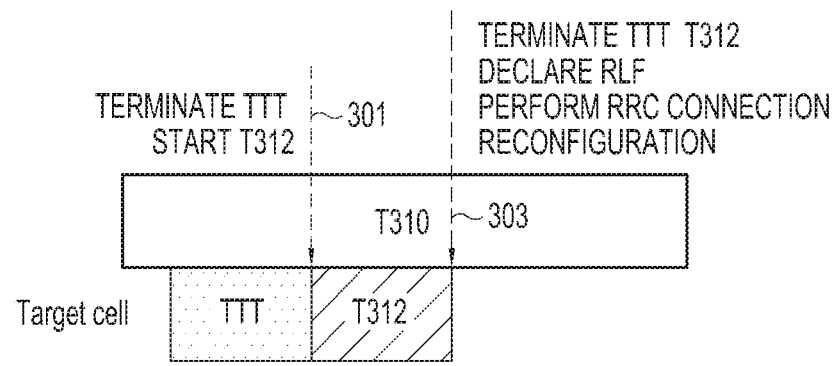
FIG. 3 illustrates an operation of a proposed waiting timer T312 in an LTE system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although various embodiments of the present disclosure will be described with reference to, for example, a Long Term Evolution (LTE) system, the various embodiments of the present disclosure may be applied to various other wireless communication systems that can use or run a waiting timer upon determination of a Radio Link Failure (RLF), in the same way.

In addition, various embodiments of the present disclosure may be applied to both of the homogeneous network including the same type of cells and the heterogeneous network including different types of cells. For example, in the heterogeneous network including macro cells and small cells, macro-to-macro, macro-to-small, small-to-macro and/or small-to-small cell handovers may occur, and embodiments of the present disclosure may be generally applied regardless of these types of handovers.

First, for a better understanding of the present disclosure, the general operation of the waiting timer T312 will be described as operations (1) to (5) below.

(1) If the situation where a channel gain between the UE and the serving evolved Node B (eNB) is low and Block Error Rate $(BLER)_{PDCCH}$ is lower than $BLER_{threshold}$ (i.e., the block error rate $BLER_{PDCCH}$ of a Physical Downlink Control Channel (PDCCH) is lower than a predetermined threshold $BLER_{threshold}$ in the LTE system) occurs a predetermined number of times, the RLF timer T310 may be started.

(2) If the User Equipment (UE) detects a target eNB that satisfies a handover condition, the handover timer Time To Trigger (TTT) may be started.

(3) If the handover timer TTT is terminated, the waiting timer T312 may be started.

(4) The UE may attempt handover until the waiting timer T312 is terminated.

(5) If the waiting timer T312 is terminated, the UE may declare the RLF regardless of the remaining RLF timer T310, and perform Radio Resource Control (RRC) connection reconfiguration.

Figure 4:
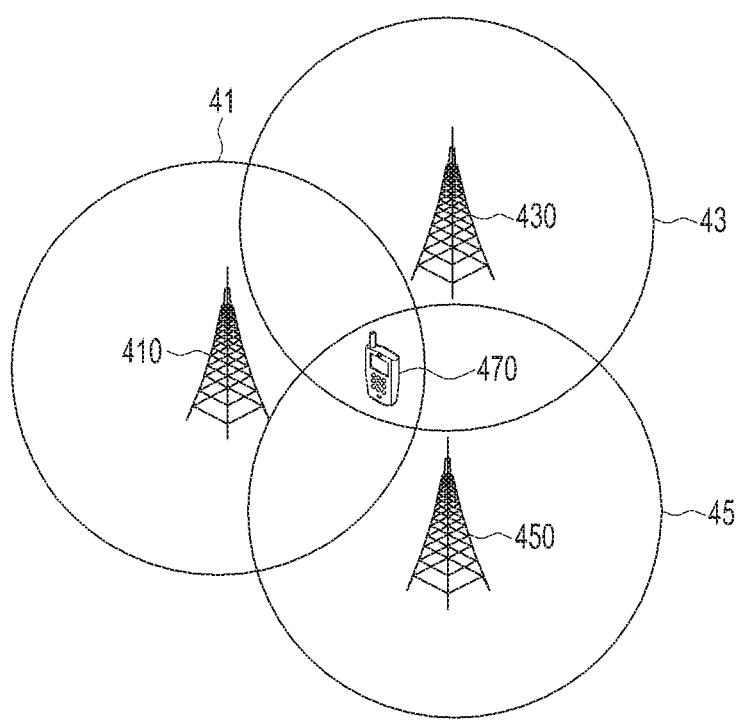
FIG. 4 illustrates an example of a configuration of a wireless communication system for controlling an operation of a waiting timer T312 according to an embodiment of the present disclosure.

FIG. 4 illustrates an example of a configuration of a wireless communication system for controlling an operation of a waiting timer T312 according to an embodiment of the present disclosure.

Referring to FIG. 4, if a handover event occurs while a UE 470 is performing communication with a serving eNB 410 of a serving cell 41, the UE 470 may detect target eNBs 430 and 450 of target cells 43 and 45 for handover. Examples in FIGS. 5 to 12 correspond to proposed operations, namely an operation of the waiting timer T312 when the UE 470 has detected multiple target cells 43 and 45 for handover; an operation of the waiting timer T312, which is performed depending on whether the UE 470 has received a handover-related message; an operation of efficient configuration measures for the start point and length of the waiting timer T312; an operation of terminating the waiting timer T312; and an operation of the waiting timer T312, which is performed depending on the handover event and the entering/leaving condition. In the examples of FIGS. 4 to 12, the number of target cells is assumed to be 2, for convenience of description. However, the present disclosure may be applied in the same way even if two or more target cells are present.

Figure 5:
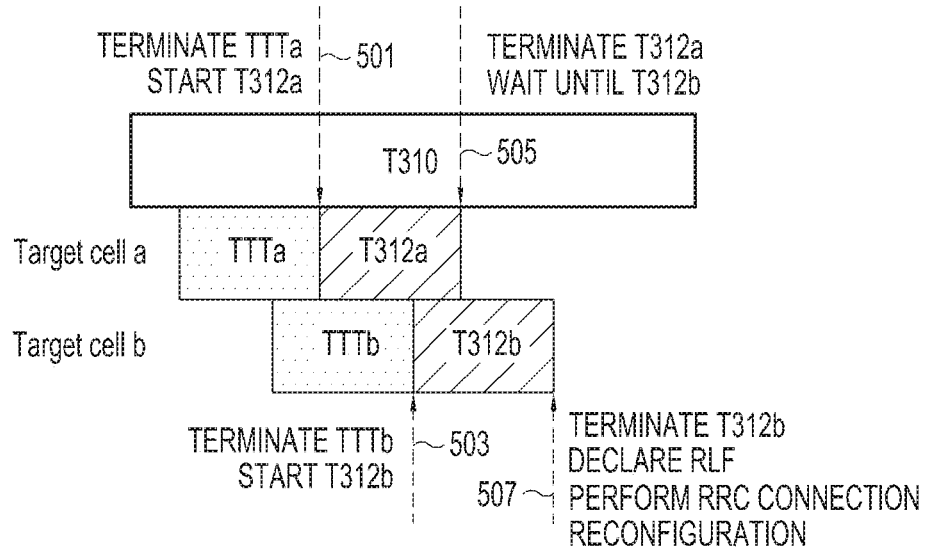
FIG. 5 illustrates a scheme for controlling a waiting timer T312 when multiple target cells for handover are detected in a wireless communication system according to an embodiment of the present disclosure.

FIG. 5 illustrates a scheme for controlling a waiting timer T312 when multiple target cells for handover are detected in a wireless communication system according to an embodiment of the present disclosure.

In the actual network environment, a UE may detect multiple target cells (or target eNBs) that satisfy a handover condition. Particularly, in the heterogeneous network where multiple small cells are densely installed, more target cells may be detected, compared with in the homogeneous network including only the macro cells.

Referring to FIG. 5, a situation where there are two target cells for handover is illustrated. First, the UE may start a handover timer 'a' TTTa by detecting a target cell 'a', and may start a handover timer 'b' TTTb by detecting a target cell 'b' while the handover timer 'a' TTTa is running. In addition, if the handover timer 'a' TTTa is terminated at time 501, the UE may start a waiting timer 'a' T312a for the target cell 'a', and if the handover timer 'b' TTTb is terminated at time 503, the UE may start a waiting timer 'b' T312b for the target cell 'b'. If the waiting timer 'a' T312a for the target cell 'a' that the UE has first detected is terminated and the waiting timer T312 follows the above-described general operation, the UE may declare the RLF regardless of the remaining time of the RLF timer T310, and then perform RRC connection reconfiguration.

In the example of FIG. 5, unlike in the general operation of the waiting timer T312, if there are multiple handover target eNBs, the UE may declare the RLF based on the waiting timer T312 for the target cell that is detected later, instead of declaring the RLF based on the waiting timer T312 for the target cell that is detected first. In other words, the UE may declare the RLF when the waiting timer 'b' T312b for the later detected target cell 'b' is terminated as shown by reference numeral 507, instead of declaring the RLF when the waiting timer 'a' T312a for the first detected target cell 'a' is terminated at time 505 in FIG. 5. After the handover timer 'a' TTTa is terminated, the UE may attempt handover to the target cell 'a' until the waiting timer 'b' T312b is terminated, and at the same time, after the handover timer 'b' TTTb is terminated, the UE may attempt handover to the target cell 'b' until the waiting timer 'b' T312b is terminated. For the UE, performing handover is advantageous over performing RRC connection reconfiguration in terms of the service disconnection time. Therefore, if there are multiple handover target eNBs, it is preferable for the UE to have the opportunity to sequentially perform handover to each of the target eNBs. To this end, it is more efficient for the UE to declare the RLF based on the waiting timer 'b' T312b for the later detected target cell 'b' as shown in the example of FIG. 5.

Figure 13:
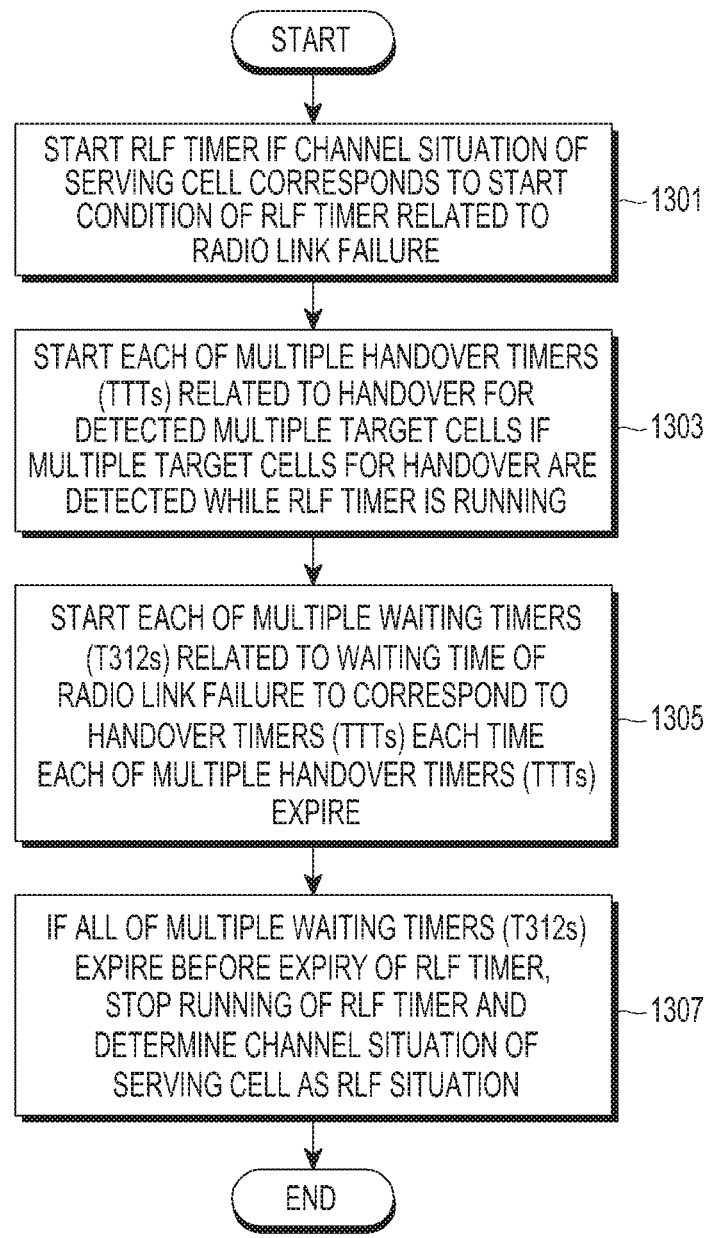
FIG. 13 is a flowchart illustrating a User Equipment's (UE's) operation of controlling a waiting timer T312 in accordance with the scheme in FIG. 5 according to an embodiment of the present disclosure.

FIG. 13 is a flowchart illustrating a UE's operation of controlling a waiting timer T312 in accordance with the scheme in FIG. 5 according to an embodiment of the present disclosure.

Referring to FIG. 13, in operation 1301, the UE may start an RLF timer if the channel situation of the serving cell corresponds to a start condition of the RLF timer. In operation 1303, the UE may start each of multiple handover timers TTTs related to handover for detected multiple target cells, if the multiple target cells for handover are detected while the RLF timer is running. In operation 1305, the UE may start each of the multiple waiting timers T312s related to a waiting time of the radio link failure to correspond to the handover timers TTTs, each time each of the multiple handover timers TTTs is terminated. In operation 1307, if all of the multiple waiting timers T312s are terminated before the RLF timer is terminated, the UE may stop the running of the RLF timer, determine (or declare) the channel situation of the serving cell as the RLF situation, and perform RRC connection reconfiguration.

In another embodiment of the present disclosure, if the UE operates one waiting timer T312, the UE may newly update (or reset) the running waiting timer T312, each time each of the multiple handover timers TTTs is terminated. If the waiting timer T312 is terminated before the RLF timer is terminated, the UE may stop the running of the RLF timer, determine (or declare) the channel situation of the serving cell as the RLF situation, and perform RRC connection reconfiguration. In order to support this operation, the details (underlined parts) as shown in Table 3 below may be added to Technical Specification (TS) 36.331, 5.5.4.1 Measurement report triggering—General item in the specification for the $3^{rd}$ Generation Partnership Project (3GPP) LTE system.

TABLE 3

2> if the triggerType is set to event and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include an measurement reporting entry for this measId (a first cell triggers the event):
   3> include a measurement reporting entry within the VarMeasReportList for this measId;
   3> set the numberOfReportsSent defined within the VarMeasReportList for this measId to 0;
   3> include the concerned cell(s) in the cellsTriggeredList defined within the VarMeasReportList for this measId;
   <u>3> if the event is A3 or A4 or A5 and if the UE supports T312 and if the variable useT312-r12 is set for this event and if T310 is running:</u>
      <u>4> if T312 is not running:</u>
         <u>5> start timer T312 with the value configured in the corresponding measObjectEUTRA:</u>
      <u>4> else:</u>
         <u>5> reset timer T312 with the value configured in the corresponding measObjectEUTRA:</u>
   3> initiate the measurement reporting procedure, as specified in 5.5.5;
2> if the triggerType is set to event and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
   3> set the numberOfReportsSent defined within the VarMeasReportList for this measId to 0;
   3> include the concerned cell(s) in the cellsTriggeredList defined within the VarMeasReportList for this measId;
   <u>3> if the event is A3 or A4 or A5 and if the UE supports T312 and if the variable useT312-r12 is set for this event and if T310 is running:</u>
      <u>4> if T312 is not running:</u>
         <u>5> start timer T312 with the value configured in the corresponding measObjectEUTRA:</u>
      <u>4> else:</u>
         <u>5> reset timer T312 with the value configured in the corresponding measObjectEUTRA:</u>
   3> initiate the measurement reporting procedure, as specified in 5.5.5;

Generally, when a UE has detected multiple target cells for handover, it is preferable for the UE to perform handover to the target cell that has the best signal strength or quality. Therefore, it is possible to adaptively control the declaration time for the RLF based on the signal strengths of the multiple target cells.

Figure 6:
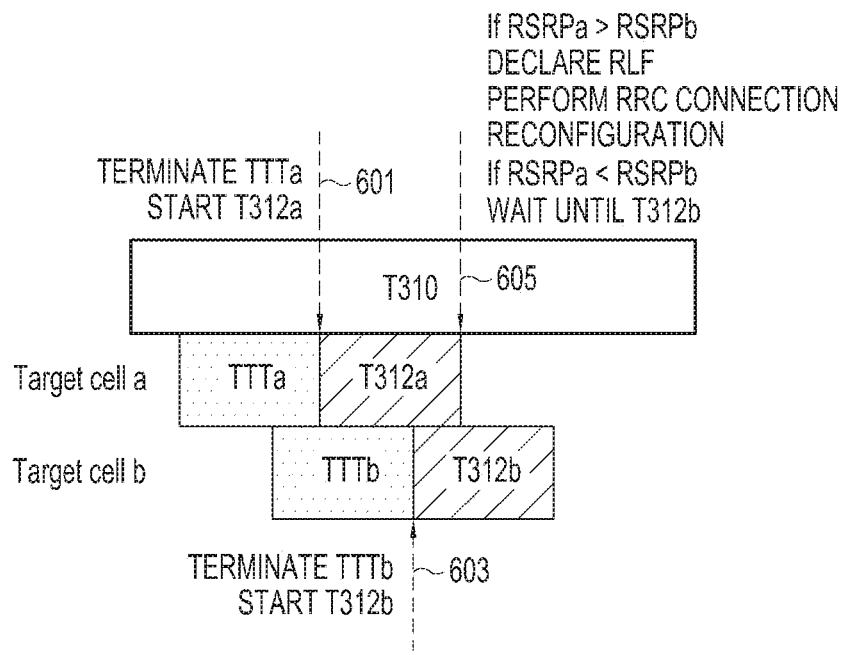
FIG. 6 illustrates a scheme for controlling a waiting timer T312 based on signal strengths of multiple target cells for handover in a wireless communication system according to an embodiment of the present disclosure.

FIG. 6 illustrates a scheme for controlling a waiting timer T312 based on signal strengths of multiple target cells for handover in a wireless communication system according to an embodiment of the present disclosure.

Referring to FIG. 6, the UE may start a handover timer 'a' TTTa by detecting a target cell 'a', and may start a handover timer 'b' TTTb by detecting a target cell 'b' while the handover timer 'a' TTTa is running. In addition, if the handover timer 'a' TTTa is terminated at time 601, the UE may start a waiting timer 'a' T312a for the target cell 'a', and if the handover timer 'b' TTTb is terminated at time 603, the UE may start a waiting timer 'b' T312b for the target cell 'b'. If the waiting timer 'a' T312a for the first detected target cell 'a' is terminated, the UE may determine at time 605 whether the waiting timer 'b' T312b for the target cell 'b' is running, and if the waiting timer 'b' T312b is running, the UE may compare the signal strength of the target cell 'a' with the signal strength of the target cell 'b'. If the signal strength of the target cell 'b' is greater than the signal strength of the target cell 'a', the UE may wait until the waiting timer 'b' T312b for the target cell 'b' is terminated, and if the signal strength of the target cell 'b' is less than the signal strength of the target cell 'a', the UE may declare the RLF as soon as the waiting timer 'a' T312a is terminated, without waiting until the waiting timer 'b' T312b for the target cell 'b' is terminated, and then perform RRC connection reconfiguration.

The scheme in FIG. 6 is efficient in terms of the fact that the UE prefers the handover target eNB having the best signal strength. In other words, the UE may postpone the RLF declaration, if a handover target eNB having a better signal strength is present at the time the RLF declaration is possible. Otherwise, the UE may immediately declare the RLF. Through this operation, the UE may reduce the handover time, and may quickly start the RRC connection reconfiguration process.

Figure 14:
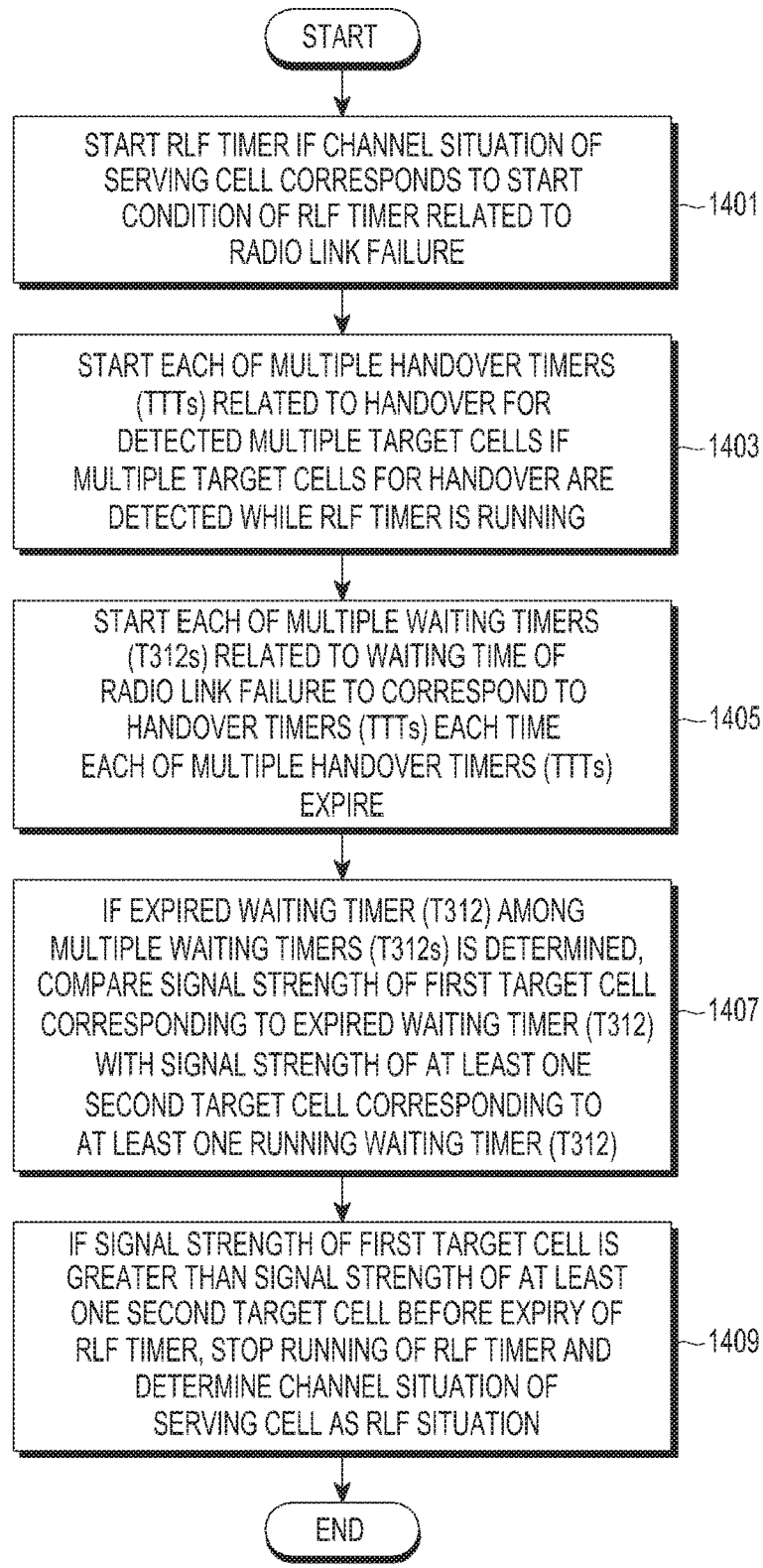
FIG. 14 is a flowchart illustrating a UE's operation of controlling a waiting timer T312 in accordance with the scheme in FIG. 6 according to an embodiment of the present disclosure.

FIG. 14 is a flowchart illustrating a UE's operation of controlling a waiting timer T312 in accordance with the scheme in FIG. 6 according to an embodiment of the present disclosure.

Referring to FIG. 14, in operation 1401, the UE may start an RLF timer if the channel situation of the serving cell corresponds to a start condition of the RLF timer. In operation 1403, the UE may start each of multiple handover timers TTTs related to handover for detected multiple target cells, if the multiple target cells for handover are detected while the RLF timer is running. In operation 1405, the UE may start each of the multiple waiting timers T312s related to a waiting time of the radio link failure to correspond to the handover timers TTTs, each time each of the multiple handover timers TTTs is terminated.

In operation 1407, if an expired waiting timer T312 among the plurality waiting timers T312s is determined, the UE may compare the signal strength of a first target cell corresponding to the expired waiting timer T312 with the signal strength of at least one second target cell corresponding to at least one running waiting timer T312. In operation 1409, if the signal strength of the first target cell is greater than the signal strength of the at least one second target cell before the RLF timer is terminated, the UE may stop the running of the RLF timer, determine the channel situation of the serving cell as the RLF situation, and perform RRC connection reconfiguration.

Figure 7:
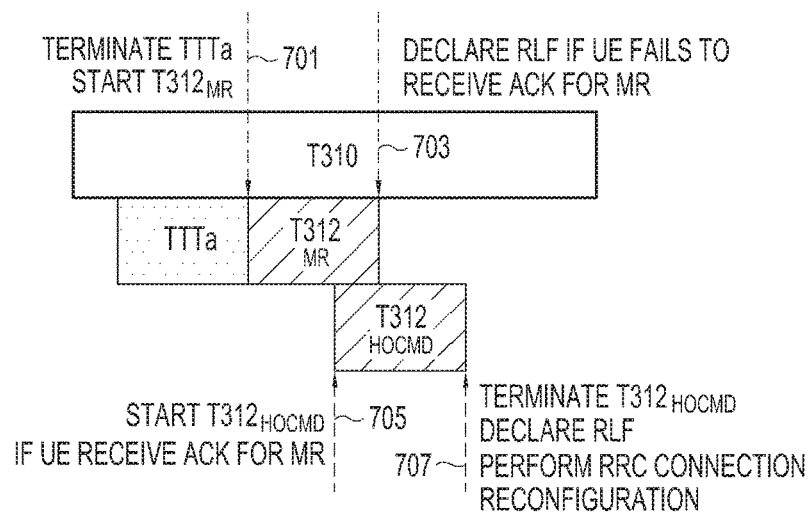
FIG. 7 illustrates a scheme for controlling a waiting timer T312 depending on whether a handover-related message is received in a wireless communication system according to an embodiment of the present disclosure.

FIG. 7 illustrates a scheme for controlling a waiting timer T312 depending on whether a handover-related message is received in a wireless communication system according to an embodiment of the present disclosure.

First, as described in the handover procedure in FIG. 1, a UE may send a measurement report message to a serving eNB after expiration of a handover timer TTT, and receive a handover command message from a target eNB. Since the measurement report message is transmitted over an uplink and the handover command message is transmitted over a downlink, the two messages may experience different channel qualities while being transmitted. Therefore, transmission/reception of the two handover-related messages may be considered independent of each other, and a different waiting timer T312 may be applied to each message.

If the waiting timer that is applied when the UE receives Acknowledgement (ACK) for the measurement report message after expiration of the handover timer TTT is defined as $T312_{MR}$, and the waiting timer that is applied when the UE receives a handover command message after receiving the ACK for the measurement report message is defined as $T312_{HOCMD}$, then the UE may terminate the handover timer TTT and then start $T312_{MR}$ at time 701 in FIG. 7. If the UE fails to receive ACK for the measurement report message during $T312_{MR}$, the UE may declare the RLF and perform RRC connection reconfiguration after expiration of $T312_{MR}$, at time 703. On the other hand, if the UE has successfully received ACK for the measurement report message during $T312_{MR}$, the UE may terminate $T312_{MR}$ and start $T312_{HOCMD}$ at time 705. If the UE fails to receive a handover command message during $T312_{HOCMD}$, the UE may declare the RLF and perform RRC connection reconfiguration after expiration of $T312_{HOCMD}$, at time 707. However, if the UE has successfully received a handover command message during $T312_{HOCMD}$, the UE may continue the remaining handover process. If $T312_{MR}$ and $T312_{HOCMD}$ are separately defined as shown in the example of FIG. 7, it is possible to separately control the waiting timers depending on the uplink and downlink performances between the UE and the serving eNB.

Figure 15:
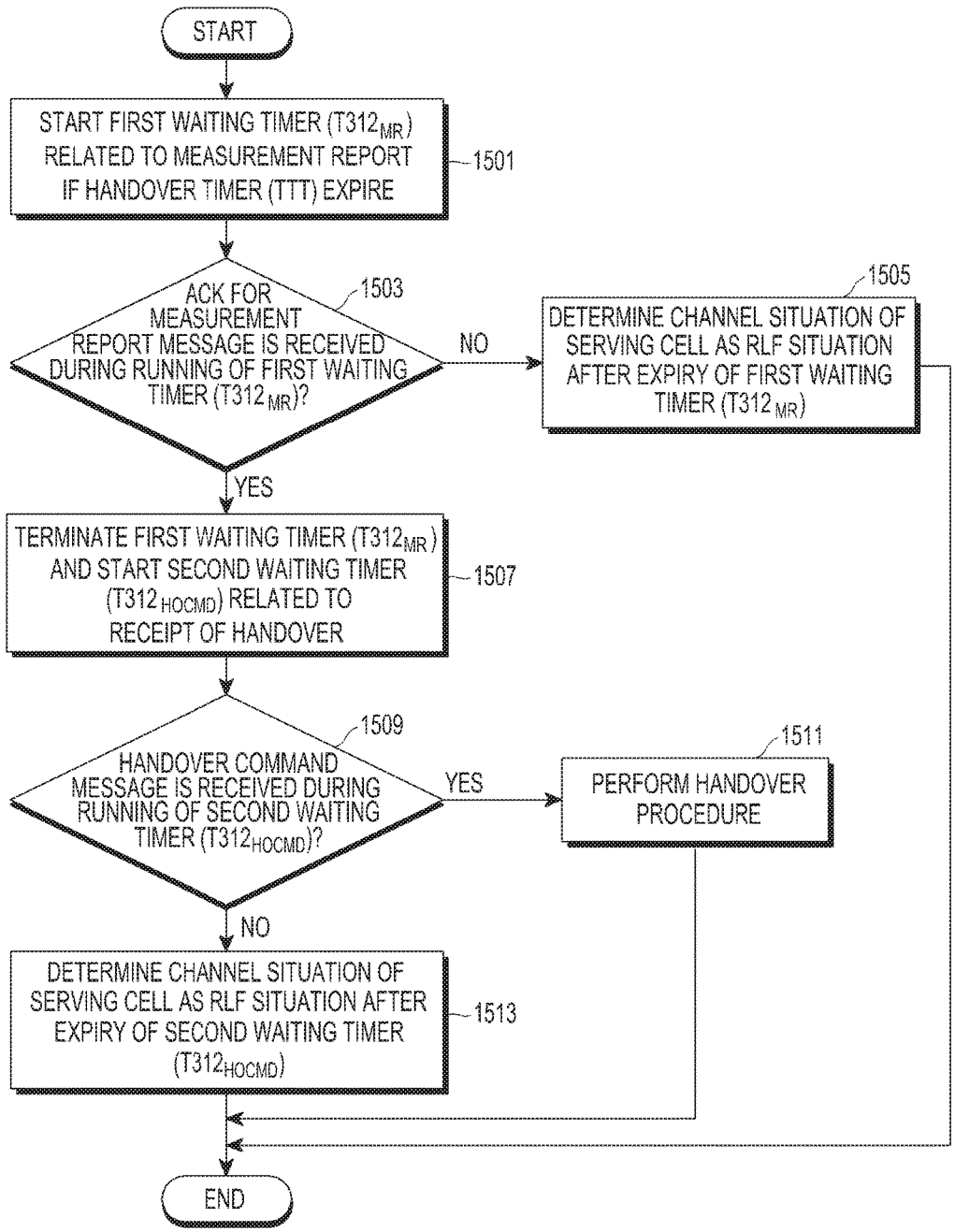
FIG. 15 is a flowchart illustrating a UE's operation of separately controlling a waiting timer T312 based on whether a handover-related message is received in accordance with the scheme in FIG. 7 according to an embodiment of the present disclosure.

FIG. 15 is a flowchart illustrating a UE's operation of separately controlling a waiting timer T312 based on whether a handover-related message is received in accordance with the scheme in FIG. 7 according to an embodiment of the present disclosure.

Referring to FIG. 15, in operation 1501, the UE may start a first waiting timer $T312_{MR}$ related to measurement report, if a handover timer TTT expires (or is terminated). In operation 1503, the UE may determine whether ACK for the measurement report message is received from an eNB while the first waiting timer $T312_{MR}$ is running. If the UE fails to receive ACK, the UE may determine the channel situation of the serving cell as the RLF situation and perform RRC connection reconfiguration after expiration of the first waiting timer $T312_{MR}$, in operation 1505. On the other hand, if it is determined in operation 1503 that the UE has received ACK, the UE may terminate the first waiting timer $T312_{MR}$ and start a second waiting timer $T312_{HOCMD}$ related to reception of the handover command message, in operation 1507. In operation 1509, the UE may determine whether the handover command message is received while the second waiting timer $T312_{HOCMD}$ is running. If the UE has received the handover command message, the UE may perform the handover procedure in operation 1511, and if the UE has failed to receive the handover command message, the UE may determine the channel situation of the serving cell as the RLF situation and perform RRC connection reconfiguration after expiration of the second waiting timer $T312_{HOCMD}$, in operation 1513.

Reference will now be made to FIGS. 8A to 10, to describe a scheme for controlling the start point and length of a waiting timer T312 in various embodiments of the present disclosure.

First, the early termination technique for an RLF timer T310 is to allow a UE to immediately declare the RLF upon detection of a handover target eNB and perform RRC connection reconfiguration, in order to reduce the time for which the UE is connected to the serving eNB even though the channel gain with the serving eNB is not good. Therefore, if the early termination technique for an RLF timer T310 is used, it is possible to reduce the time for which the UE is connected to the serving eNB having a poor channel gain, but the UE's opportunity to monitor the recovery of the channel gain of the serving cell may be likely to be reduced. In other words, there is a trade-off relationship between the time for which the UE may experience the low channel gain and the possibility that the channel gain will be recovered.

The operation control for the waiting timer T312 has been proposed to improve the trade-off relationship. In this operation control, instead of immediately declaring the RLF upon detecting a handover target eNB, the UE may attempt handover while additionally monitoring the channel during the waiting timer T312, and declare the RLF without waiting any longer, if the waiting timer T312 expires. However, even if the operation control for the waiting timer T312 is used, the trade-off relationship between the time for which the UE may experience the low channel gain and the possibility that the channel gain will be recovered may still exist depending on the start point and length of the waiting timer T312. Therefore, it is necessary to control the start point and length of the waiting timer T312 taking into account the trade-off relationship between the time for which the UE may experience the low channel gain and the possibility that the channel gain will be recovered.

Figure 8A:
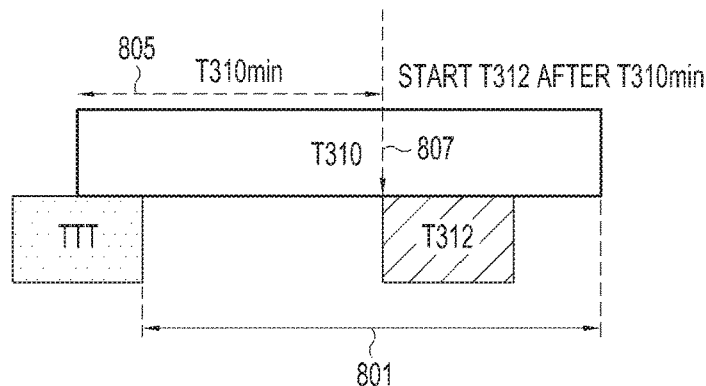
FIGS. 8A and 8B illustrate a scheme for controlling a start point of a waiting timer T312 in a wireless communication system according to various embodiments of the present disclosure.
Figure 8B:
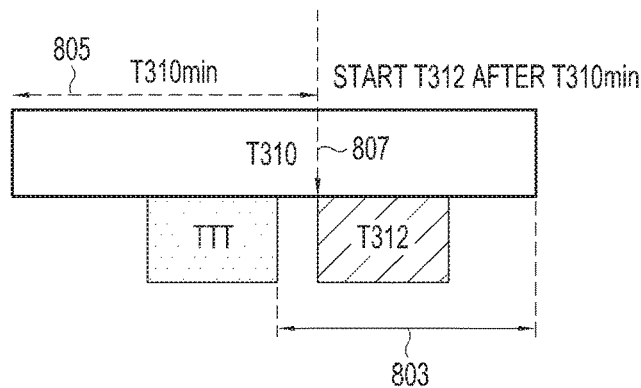

FIGS. 8A and 8B illustrate a scheme for controlling a start point of a waiting timer T312 in a wireless communication system according to various embodiments of the present disclosure.

In the above-described basic operation of the waiting timer T312, after detecting a handover target eNB, the UE may immediately start the waiting timer T312 if the handover timer TTT expires. If the handover timer TTT expires at the beginning of the running of the RLF timer T310 as shown in FIG. 8A, a relatively long RLF timer T310 may be left for the UE as shown by reference numeral 801. On the other hand, if the handover timer TTT expires at the middle of the RLF timer T310 as shown in FIG. 8B, a relatively short RLF timer T310 may be left for the UE as shown by reference numeral 803. In both of the above two cases, the UE may monitor the channel recovery of the serving eNB and attempt handover only during the waiting timer T312 that starts after expiration of the handover timer TTT. Therefore, in the examples of FIGS. 8A and 8B, in order to ensure the RLF timer T310 of a predetermined time for all UEs, the start point of the waiting timer T312 may be controlled so that the waiting timer T312 may start after a predetermined minimum guaranteed time (T310 min) 805 of the RLF timer T310 as shown by reference numeral 807.

As another example, the following operations (1) to (3) are proposed to allow a UE to be guaranteed the RLF timer T310 of a minimum of T310 min regardless of the point where the handover timer TTT has expired.

(1) If the handover timer TTT expires while the RLF timer T310 is running, the UE may determine the remaining RLF timer T310.

(2) If the remaining RLF timer T310 is less or shorter than T310 min, the UE may immediately start the waiting timer T312 after expiration of the handover timer TTT as in the general operation of the technique for a waiting timer T312.

(3) If the remaining RLF timer T310 is greater or longer than T310 min, the UE may start the waiting timer T312 after waiting for T310 min.

When the above operations (1) to (3) are applied, all UEs may be guaranteed the time for which the channel gain of the serving eNB is recovered and the UEs attempt handover for a predetermined time, after detecting a target cell for handover.

In addition, it is possible to adjust the length of the waiting timer T312 depending on the time of the RLF timer T310 that is left at the expiration time of the handover timer TTT. If the remaining time of the RLF timer T310 is longer, the length of the waiting timer T312 may be set longer, and if the remaining time of the RLF timer T310 is shorter, the length of the waiting timer T312 may be set shorter. In other words, the present disclosure proposes a scheme for controlling the length of the waiting timer T312 in proportion to the remaining time of the RLF timer T310. If the proposed scheme for controlling the length of the waiting timer T312 is applied, a UE that has detected a target cell for handover at the beginning of the RLF timer T310 may have the time for which the channel gain of the serving eNB is recovered and the UE attempts handover for a longer time, because the time up to now since the decrease in the channel gain of the serving eNB is still short. On the other hand, a UE that has detected a target cell since the middle of the RLF timer T310 may be controlled to have the time for which the channel gain of the serving eNB is recovered and the UE attempts handover for a shorter time, because the time up to now since the decrease in the channel gain of the serving eNB is relatively long.

Figure 9A:
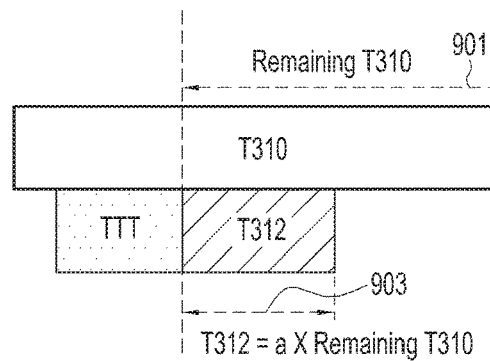
FIGS. 9A and 9B illustrate a scheme for controlling a length of a waiting timer T312 in a wireless communication system according to various embodiments of the present disclosure.
Figure 9B:
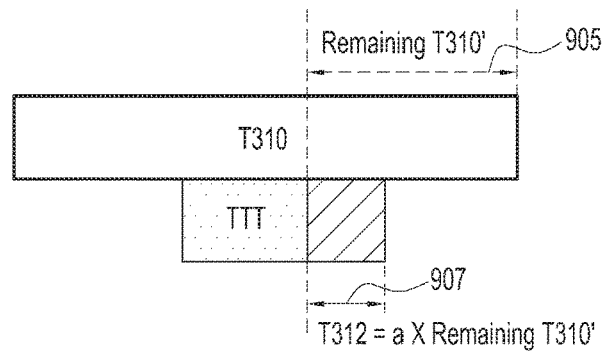

FIGS. 9A and 9B illustrate a scheme for controlling a length of a waiting timer T312 in a wireless communication system according to various embodiments of the present disclosure.

Referring to FIGS. 9A and 9B, if the handover timer TTT expires while the RLF timer T310 is running, the UE may determine the remaining time (Remaining T310 and Remaining T310') of the RLF timers T310 as shown by reference numerals 901 and 905. The UE may determine a length of the waiting timer T312 by multiplying the remaining time (Remaining T310 and Remaining T310') of the RLF timer T310 by a predetermined value a as shown by reference numerals 903 and 907. According to an embodiment of the present disclosure, since FIG. 9A is longer than FIG. 9B in terms of the remaining time of the RLF timer T310, the UE may be controlled so that the time length of the waiting timer T312 in FIG. 9A may be longer than the time length of the waiting timer T312 in FIG. 9B in proportion to the remaining time.

Figure 10A:
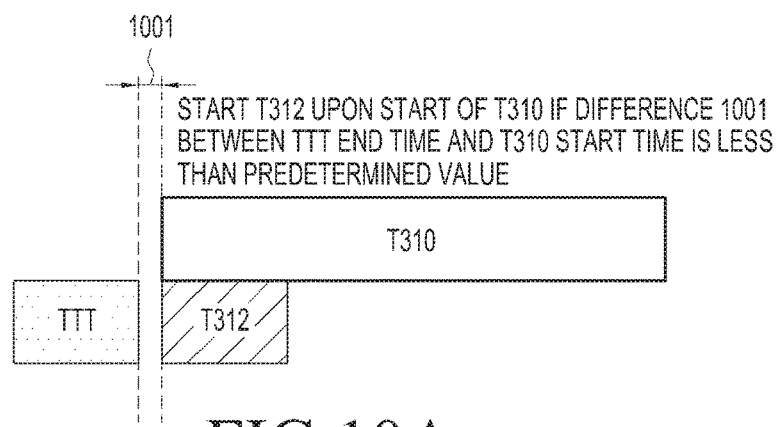
FIGS. 10A and 10B illustrate another scheme for controlling a start point of a waiting timer T312 in a wireless communication system according to various embodiments of the present disclosure.
Figure 10B:
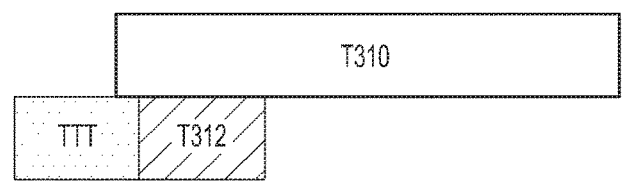

FIGS. 10A and 10B illustrate another scheme for controlling a start point of a waiting timer T312 in a wireless communication system according to various embodiments of the present disclosure.

If a situation where the handover timer TTT has expired slightly earlier than the RLF timer T310 is assumed as another example, this may be the same as an example in FIG. 10A. According to the general operation of the technique for a waiting timer T312, the waiting timer T312 may start only if the handover timer TTT expires while the RLF timer T310 is running. There is no big difference between a case where the handover timer TTT has expired slightly earlier than the RLF timer T310 as shown in FIG. 10A and a case where the handover timer TTT has expired slightly later than the RLF timer T310 as shown in FIG. 10B. However, according to the general operation of the technique for a waiting timer T312, the waiting timer T312 does not start in the case of FIG. 10A, and the waiting timer T312 starts in the case of FIG. 10B. In order to reduce the difference in operation and ensure the consistent operation of the waiting timer T312, the present disclosure proposes an embodiment shown in FIGS. 10A and 10B.

Referring to FIGS. 10A and 10B, another embodiment of the present disclosure to control the start point of the waiting timer T312 will be described. The UE may start the handover timer TTT after detecting a handover target eNB. The UE may attempt handover, if the handover timer TTT expires after being maintained. If the RLF timer T310 starts due to the low signal quality of the serving eNB, the UE may determine whether the handover timer TTT has expired. If the handover timer TTT has expired before the start of the RLF timer T310 as shown in FIG. 10A, the UE may determine the expiration time of the handover timer TTT. If a difference 1001 between the expiration time of the handover timer TTT and the start time of the RLF timer T310 is less than or equal to a predetermined threshold, the UE may start the waiting timer T312 at the start time of the RLF timer T310. If the difference 1001 between the expiration time of the handover timer TTT and the start time of the RLF timer T310 is greater than the threshold, the UE may not apply the technique for a waiting timer T312 and the early termination technique for an RLF timer T310. If these operations are applied, the UE may start the waiting timer T312 even though the handover timer TTT has expired before the start of the RLF timer T310. The case in FIG. 10B is the same case as the above examples in which the UE immediately starts the waiting timer T312 after the expiration of the handover timer TTT.

In the basic operation of the waiting timer T312, if the waiting timer T312 expires, the UE may declare the RLF regardless of the remaining time of the RLF timer T310, and perform RRC connection reconfiguration. However, the present disclosure proposes a control scheme of terminating the waiting timer T312 during its running, if a predetermined termination condition is satisfied.

The termination conditions of the waiting timer T312, which are proposed in an embodiment of the present disclosure, may include:

(1) a condition that the UE has received ACK for a measurement report message;

(2) a condition that the UE has successfully received a handover command message;

(3) a condition that the RLF timer T310 is terminated due to the recovery of the channel gain between the UE and the serving eNB; and (4) a condition that a leaving condition for a handover event is satisfied.

In the case of condition (1), if the UE successfully sends a measurement report message to the serving eNB, the serving eNB may send a handover request message to its neighboring eNBs. A neighboring eNB that has received the handover request message may be aware of the fact that the UE will be connected to the neighboring eNB itself soon.

Therefore, in a case where the UE has successfully sent the measurement report message, even though the UE performs RRC connection reconfiguration, it is possible to reduce the time for RRC connection reconfiguration. In this case, the UE may terminate the waiting timer T312 and perform RRC connection reconfiguration. In the case of condition (2) and condition (3), it is not necessary to maintain the waiting timer T312, since the handover is being performed smoothly and the channel gain between the UE and the serving eNB has been recovered. Therefore, the UE may terminate the waiting timer T312. Condition (4) will be described with reference to Table 4 below.

In the 3GPP LTE system, some events A1 to A6 are defined as shown in Table 4, so if the signal strength or quality of the UE satisfies at least one of the following events, the UE may report the measurement result to the serving eNB. A message used for the report is a measurement report message, and the serving eNB that has received the measurement report message may determine whether to perform handover of the UE.

TABLE 4

| Event | Description |
|---|---|
| A1 | Serving > Threshold |
| A2 | Serving < Threshold |
| A3 | Neighbor > PCell + Offset |
| A4 | Neighbor > Threshold |
| A5 | PCell < Threshold1 and Neighbor > Threshold2 |
| A6 | Neighbor > SCell + Offset |

The events in Table 4 are defined in the specifications of the 3GPP LTE system. In Table 4, events A1 and A2 are not related to the signal strength or quality for neighboring eNBs. These events may be less related to the early termination technique for an RLF timer T310 and the utilizing technique for a waiting timer T312. The reason is that even though the UE early terminates the RLF timer T310, the UE has not discovered the neighboring eNB to which the UE will perform RRC connection reconfiguration. In addition, an event A6 considers only the signal strength or quality of a Secondary Cell (SCell), and does not consider the signal strength or quality of a Primary Cell (PCell). This case may also be less related to the early termination technique for an RLF timer T310 and the technique for a waiting timer T312. The reason is that according to the specifications of the 3GPP LTE system, which have been published up to now, the UE does not declare the RLF for the SCell. However, if the UE declares the RLF even for the SCell as the specifications of the 3GPP LTE system are changed in the future, the event A6 may also be highly related to the early termination technique for an RLF timer T310 and the technique for a waiting timer T312.

The technique for a waiting timer T312 may be applied when the RLF timer T310 is running (i.e., the signal quality of the serving eNB is not good). Therefore, the technique for a waiting timer T312 is highly likely to be applied to the handover event in which neighboring eNBs are taken into consideration. In other words, the technique for a waiting timer T312 is highly likely to be applied to the events A3, A4 and A5 in which the signal strength or quality of the neighboring eNBs are taken into consideration. Therefore, in an embodiment of the present disclosure, the eNB may inform the UE whether to apply the technique for a waiting timer T312, when the UE has satisfied a specific event.

Figure 16:
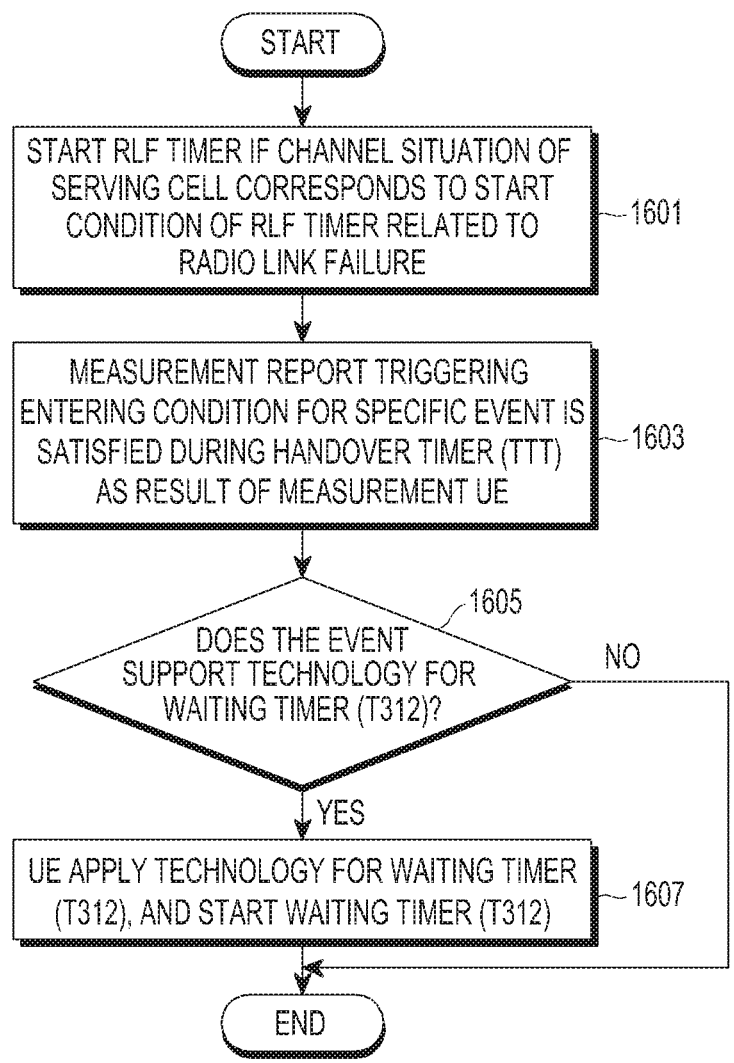
FIG. 16 is a flowchart illustrating a UE's operation of controlling a waiting timer T312 when the UE satisfies a specific event according to an embodiment of the present disclosure.

FIG. 16 is a flowchart illustrating a UE's operation of controlling a waiting timer T312 when the UE satisfies a specific event according to an embodiment of the present disclosure.

Referring to FIG. 16, in operation 1601, the UE may start the RLF timer if the channel situation of the serving cell corresponds to a start condition of the RLF timer. As a result of the measurement by the UE, if a measurement report triggering entering condition for a specific event is satisfied during the time of the handover timer TTT in operation 1603, the UE may determine in operation 1605 whether the specific event supports the technique for a waiting timer T312. If the specific event supports the technique for a waiting timer T312, the UE may start the waiting timer T312 by applying the technique for a waiting timer T312 in operation 1607.

On the other hand, if the specific event does not support the technique for a waiting timer T312, the UE may determine the presence/absence of the RLF in a manner according to the related art.

In the example of FIG. 16, if the UE has satisfied a specific event, the UE may apply the technique for a waiting timer T312 (i.e., may start the waiting timer T312). However, if the UE has satisfied another specific event, the UE may not apply the technique for a waiting timer T312 (i.e., may not start the waiting timer T312). In order to support these operations, the details (underlined parts) as shown in Tables 5 to 7 below may be added to TS 36.331, 5.5.4.1 Measurement report triggering—General item, and MeasObjectEUTRA information element, and ReportConfigEUTRA information element items in the specification for the 3GPP LTE system. Here, MeasObjectEUTRA information element and ReportConfigEUTRA information element may be included in an RRC message (e.g., an RRC connection (re)configuration message) that is sent from the eNB to the UE in Evolved Universal Terrestrial Radio Access Network (EUTRAN) as known in the 3GPP LTE standard. The RRC connection (re)configuration message may be sent from the eNB to the UE, for (re)configuration of an RRC connection such as resource allocation/de-allocation, handover, measurement configuration, and cell addition/release. The information (e.g., waiting timer information) for supporting the technique for a waiting timer T312, which is proposed in an embodiment of the present disclosure, may be provided to the UE through the MeasObjectEUTRA information element and ReportConfigEUTRA information element, and the UE may receive the waiting timer information through an RRC message before occurrence of the specific event. In terms of measurement, since the UE should know when and what the UE should measure, the UE may receive an RRC connection (re)configuration message including the waiting timer information before occurrence of the running of the RLF timer T310 and the expiration of the handover timer TTT.

The waiting timer information may include at least one of information indicating support/non-support of the waiting timer T312 in the network and a configured value for the waiting timer T312.

In Table 7 below, ReportConfigEUTRA information element may include information indicating support/non-support of the waiting timer T312. In Table 6 below, MeasObjectEUTRA information element may include a configured value for the waiting timer T312. The configured value may be construed as a configured time of the waiting timer T312. The configured value for the waiting timer T312 may be individually configured for each event as illustrated in Table 6.

In addition, referring to "if the entry condition applicable for this event~" in the first line in Table 5 below, it can be noted in an embodiment of the present disclosure that the waiting timer T312 is started, if an entering condition of each event is satisfied.

TABLE 5

5.5.4.1 General

2> if the triggerType is set to event and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include an measurement reporting entry for this measId (a first cell triggers the event):
   3> include a measurement reporting entry within the VarMeasReportList for this measId;
   3> set the numberOfReportsSent defined within the VarMeasReportList for this measId to 0;
   3> include the concerned cell(s) in the cellsTriggeredList defined within the VarMeasReportList for this measId;
   <u>3> if the UE supports T312 and if use T312-r12 is set for this event and ifT310is running:</u>
      <u>4> if T312 is not running:</u>
         <u>5> start timer T312 with the value configured in the corresponding measObject;</u>
   3> initiate the measurement reporting procedure, as specified in 5.5.5;
2> if the triggerType is set to event and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
   3> set the numberOfReportsSent defined within the VarMeasReportList for this measId to 0;
   3> include the concerned cell(s) in the cellsTriggeredList defined within the VarMeasReportList for this measId;
   <u>3> if the UE supports T312 and if useT312-r12 is set for this event and ifT310is running:</u>
      <u>4> if T312 is not running:</u>
         <u>5> start timer T312 with the value configured in the corresponding measObject;</u>
   3> initiate the measurement reporting procedure, as specified in 5.5.5;

TABLE 6

MeasObjectEUTRA

MeasObjectEUTRA information element

<u>[[t312-r12 ENUMERATED {ms0, ms50, ms100, ms200, ms300, ms400, ms500, ms1000} OPTIONAL, -- Need ON]</u>

MeasObjectEUTRA field descriptions

<u>t312-r12</u>
<u>The value of timer T312. Value ms 0 represents 0 ms, 50ms represents 50ms and so on.</u>

TABLE 7

ReportConfigEUTRA

ReportConfigEUTRA information element

<u>[[useT312-r12 ENUMERATED {setup} OPTIONAL -- Cond event]]</u>
ReportConfigEUTRA field descriptions <u>useT312-r12</u>
<u>This field applies to the event functionality, and when this field is included, the UE shall use the timer T312 with the value specified in the corresponding measObject.</u>

| Conditional presence | Explanation |
|---|---|
| event | The field is optional, need OR, in case trigger Type is set to event; otherwise the field is not present. |

Next, the known events A1 to A6 defined in the specifications of the 3GPP LTE system may have handover entering condition and leaving condition as shown in Tables 8 to 13 below.

TABLE 8

Inequality A1-1 (Entering condition)
Ms − Hys > Thresh
Inequality A1-2 (Leaving condition)
Ms + Hys < Thresh
The variables in the formula are defined as follows:
Ms is the measurement result of the serving cell, not taking into account any offsets.
Hys is the hysteresis parameter for this event (i.e. hysteresis as defined within reportConfigEUTRA for this event).
Thresh is the threshold parameter for this event (i.e. a1-Threshold as defined within reportConfigEUTRA for this event).
Ms is expressed in dBm in case of RSRP, or in dB in case of RSRQ.
Hys is expressed in dB.
Thresh is expressed in the same unit as Ms.

Table 8 shows the handover entering and leaving conditions for the event A1.

TABLE 9

Inequality A2-1 (Entering condition)
Ms + Hys < Thresh
Inequality A2-2 (Leaving condition)
Ms − Hys > Thresh
The variables in the formula are defined as follows:
Ms is the measurement result of the serving cell, not taking into account any offsets.
Hys is the hysteresis parameter for this event (i.e. hysteresis as defined within reportConfigEUTRA for this event).
Thresh is the threshold parameter for this event (i.e. a2-Threshold as defined within reportConfigEUTRA for this event).

TABLE 9-continued

Ms is expressed in dBm in case of RSRP, or in dB in case of RSRQ.
Hys is expressed in dB.
Thresh is expressed in the same unit as Ms.

Table 9 shows the handover entering and leaving conditions for the event A2.

TABLE 10

Inequality A3-1 (Entering condition)
Mn + Ofn + Ocn − Hys > Mp + Ofp + Ocp + Off
Inequality A3-2 (Leaving condition)
Mn + Ofn + Ocn + Hys < Mp + Ofp + Ocp + Off
The variables in the formula are defined as follows:
Mn is the measurement result of the neighbouring cell, not taking into account any offsets.
Ofn is the frequency specific offset of the frequency of the neighbour cell.
Ocn is the cell specific offset of the neighbour cell.
Mp is the measurement result of the PCell, not taking into account any offsets.
Ofp is the frequency specific offset of the frequency of the primary frequency.
Ocp is the cell specific offset of the PCell.
Hys is the hysteresis parameter for this event.
Off is the offset parameter for this event.
Mn, Mp are expressed in dBm in case of RSRP, or in dB in case of RSRQ.
Ofn, Ocn, Ofp, Ocp, Hys, Off are expressed in dB.

Table 10 shows the handover entering and leaving conditions for the event A3.

TABLE 11

Inequality A4-1 (Entering condition)
Mn + Ofn + Ocn − Hys > Thresh
Inequality A4-2 (Leaving condition)
Mn + Ofn + Ocn + Hys < Thresh
The variables in the formula are defined as follows:
Mn is the measurement result of the neighbouring cell, not taking into account any offsets.
Ofn is the frequency specific offset of the frequency of the neighbour cell.
Ocn is the cell specific offset of the neighbour cell.
Hys is the hysteresis parameter for this event.
Thresh is the threshold parameter for this event.
Mn is expressed in dBm in case of RSRP, or in dB in case of RSRQ.
Ofn, Ocn, Hys are expressed in dB.
Thresh is expressed in the same unit as Mn.

Table 11 shows the handover entering and leaving conditions for the event A4.

TABLE 12

Inequality A5-1 (Entering condition 1)
Mp + Hys < Thresh1
Inequality A5-2 (Entering condition 2)
Mn + Ofn + Ocn − Hys > Thresh2
Inequality A5-3 (Leaving condition 1)
Mp − Hys > Thresh1
Inequality A5-4 (Leaving condition 2)
Mn + Ofn + Ocn + Hys < Thresh2
The variables in the formula are defined as follows:
Mp is the measurement result of the PCell/PSCell, not taking into account any offsets.
Mn is the measurement result of the neighbouring cell, not taking into account any offsets.
Ofn is the frequency specific offset of the frequency of the neighbour cell.
Ocn is the cell specific offset of the neighbour cell.
Hys is the hysteresis parameter for this event.
Thresh1 is the threshold parameter for this event.
Thresh2 is the threshold parameter for this event.

TABLE 12-continued

Mn, Mp are expressed in dBm in case of RSRP, or in dB in case of RSRQ
and RS-SINR.
Ofn, Ocn, Hys are expressed in dB.
Thresh1 is expressed in the same unit as Mp.
Thresh2 is expressed in the same unit as Mn.

Table 12 shows the handover entering and leaving conditions for the event A5.

TABLE 13

Inequality A6-1 (Entering condition)
Mn + Ocn − Hys > Ms + Ocs + Off
Inequality A6-2 (Leaving condition)
Mn + Ocn + Hys < Ms + Ocs + Off
The variables in the formula are defined as follows:
Mn is the measurement result of the neighbouring cell, not taking into account any offsets.
Ocn is the cell specific offset of the neighbour cell (i.e. cellIndividualOffset as defined within measObjectEUTRA corresponding to the frequency of the neighbour cell), and set to zero if not configured for the neighbour cell.
Ms is the measurement result of the serving cell, not taking into account any offsets.
Ocs is the cell specific offset of the serving cell (i.e. cellIndividualOffset as defined within measObjectEUTRA corresponding to the serving frequency), and is set to zero if not configured for the serving cell.
Hys is the hysteresis parameter for this event (i.e. hysteresis as defined within reportConfigEUTRA for this event).
Off is the offset parameter for this event (i.e. a6-Offset as defined within reportConfigEUTRA for this event).
Mn, Ms are expressed in dBm in case of RSRP, or in dB in case of RSRQ and RS-SINR.
Ocn, Ocs, Hys, Off are expressed in dB.

Table 13 represents handover entering and leaving conditions for the event A6.

In Tables 8 to 13, if the signal strength or quality measured by the UE for each event satisfies the handover entering condition during the handover timer TTT, the UE may send a measurement report message to the serving eNB to request initiation of handover. In addition, if the signal strength or quality measured by the UE for each event satisfies the handover leaving condition during the handover timer TTT, the UE may send a measurement report message to the serving eNB to request termination of the ongoing handover. As such, operations of the UE and the eNB may be distinguished depending on whether the measurement report message is a measurement report message that is sent as the measured signal strength or quality satisfies the handover entering condition, or a measurement report message that is sent as the measured signal strength or quality satisfies the handover leaving condition.

However, the basic operation of the technique for a waiting timer T312 may start the waiting timer T312 regardless of which condition the measurement report message satisfies when the message is sent. If the UE satisfies an entering condition for a specific event and the event is an event to which the technique for a waiting timer T312 is applied, it is preferable for the UE to start the waiting timer T312. However, if the UE satisfies a leaving condition and has sent a measurement report message, the UE may consider the following situation.

Figure 11:
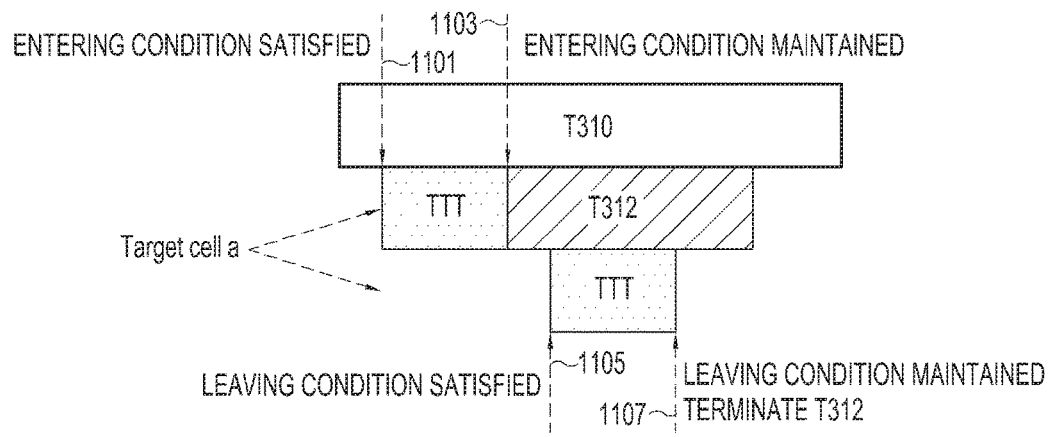
FIG. 11 illustrates a control scheme based on a termination condition of a waiting timer T312 in a wireless communication system according to an embodiment of the present disclosure.

FIG. 11 illustrates a scheme for controlling a waiting timer T312 based on a handover leaving condition in a wireless communication system according to an embodiment of the present disclosure.

Referring to FIG. 11, the UE may start the RLF timer T310 as the UE satisfies a start condition of the RLF timer T310, and the UE may start and maintain the handover timer TTT at time 1101 as the UE satisfies a handover entering condition for a specific handover event with respect to a target cell 'a'. The UE may start the waiting timer T312 at time 1103 after expiration of the handover timer TTT. The UE may satisfy the handover leaving condition at time 1105 for a specific handover event with respect to the target cell 'a' during the handover timer TTT in the interval of the waiting timer T312.

In this case, the target cell 'a' may be no longer an appropriate handover target cell from the perspective of the UE. Therefore, even though the UE declares the RLF and performs RRC connection reconfiguration after expiration of the waiting timer T312, there may be no neighboring eNBs to which the UE will perform RRC connection reconfiguration. Therefore, instead of declaring the RLF and performing RRC connection reconfiguration after terminating the waiting timer T312, it may be preferable for the UE to terminate the running waiting timer T312 and wait for the situation where the channel of the serving eNB is getting better, while waiting for the RLF timer T310. Therefore, in this embodiment, the UE may immediately terminate the waiting timer T312, if the UE satisfies the handover leaving condition for the target cell 'a' during the handover timer TTT as shown by reference numeral 1107 in FIG. 11.

Figure 17:
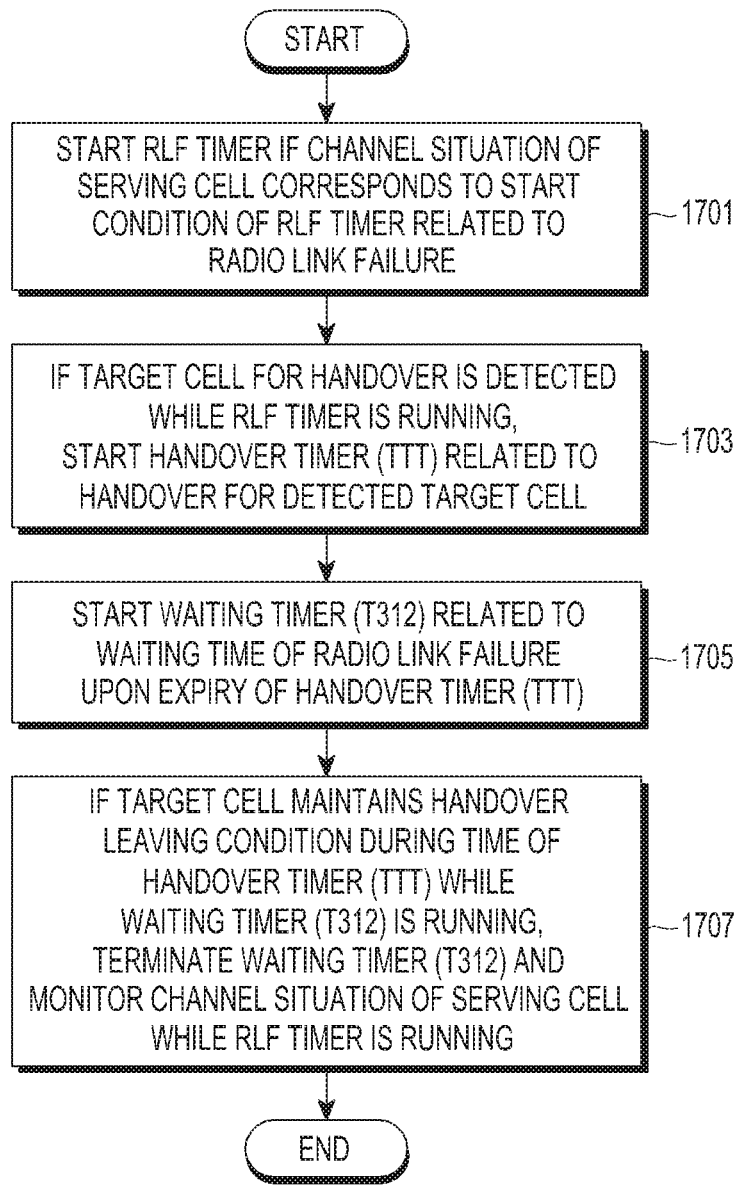
FIG. 17 is a flowchart illustrating a UE's operation of controlling a waiting timer T312 based on a handover leaving condition in a wireless communication system according to an embodiment of the present disclosure.

FIG. 17 is a flowchart illustrating a UE's operation of controlling a waiting timer T312 based on a handover leaving condition in a wireless communication system according to an embodiment of the present disclosure.

Referring to FIG. 17, in operation 1701, the UE may start the RLF timer if the channel situation of the serving cell corresponds to a start condition of the RLF timer related to the RLF. In operation 1703, the UE may start the handover timer TTT related to handover for a detected target cell, if a target cell for handover is detected while the RLF timer is running. In operation 1705, upon expiration of the handover timer TTT, the UE may start the waiting timer T312 related to the waiting time of the RLF. In operation 1707, if the target cell maintains the handover leaving condition during the handover timer TTT while the waiting timer T312 is running, the UE may terminate the waiting timer T312 and monitor the channel situation of the serving cell while the RLF timer is running.

Figure 12:
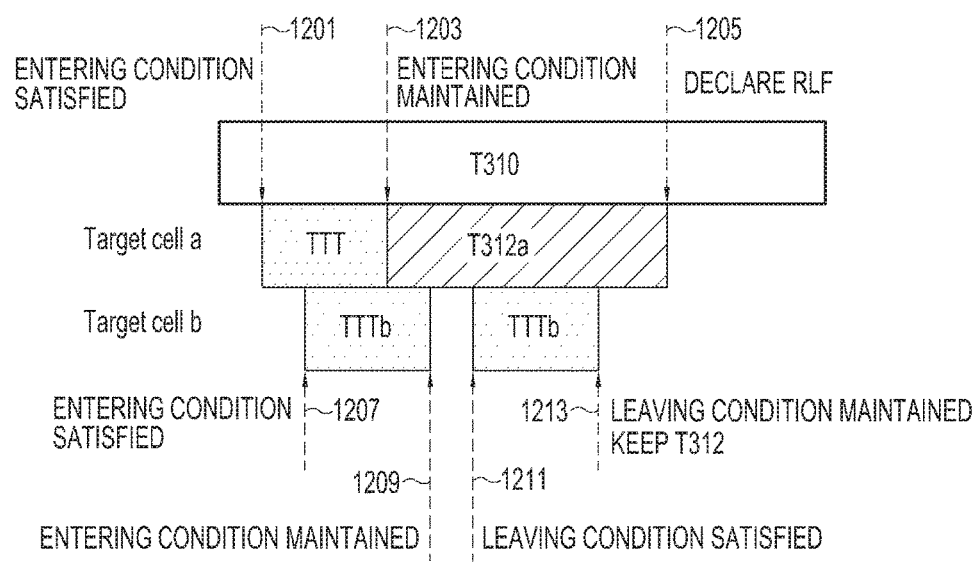
FIG. 12 illustrates another scheme for controlling a waiting timer T312 based on a handover leaving condition in a wireless communication system according to an embodiment of the present disclosure.

FIG. 12 illustrates another scheme for controlling a waiting timer T312 based on a handover leaving condition in a wireless communication system according to an embodiment of the present disclosure.

Referring to FIG. 12, the UE may start the RLF timer T310 as the UE satisfies a start condition of the RLF timer T310. At times 1201 and 1203, the UE may start and maintain a handover timer 'a' TTTa, as the UE satisfies the handover entering condition for a specific handover event with respect to a target cell 'a'. In addition, at times 1207 and 1209, the UE may start and maintain a handover timer 'b' TTTb, as the UE satisfies the handover entering condition for a specific handover event with respect to a target cell 'b'.

On the other hand, at time 1203, the UE may start the waiting timer T312 after expiration of the handover timer 'a' TTTa for the target cell 'a'. In addition, if the UE satisfies the handover leaving condition for a specific handover event with respect to the target cell 'b' during the handover timer TTT while the waiting timer T312a for the target cell 'a' is running after the handover timer 'b' TTTb is terminated, the target cell 'b' may be no longer an appropriate handover target cell from the perspective of the UE. However, the target cell 'a' may be still a proper handover target cell, since the handover leaving condition hasn't been satisfied after the satisfaction of the handover entering condition. Therefore, given the target cell 'a', the waiting timer T312 should be kept. Therefore, in this embodiment of the present disclosure, even though the UE satisfies the handover leaving condition at time 1211 for a specific handover event with respect to the target cell 'b' during the handover timer TTT, the UE may maintain the waiting timer T312a at time 1213 for the target cell 'a' without terminating the waiting timer T312a, if the UE now satisfies the handover entering condition for the specific handover event and there is the target cell 'a' for which the UE maintains the handover timer TTT.

In other words, when a specific eNB has satisfied the leaving condition for the handover event, if there is another eNB that satisfies an entering condition and maintains the entering condition, the UE may maintain the running waiting timer T312, and if there is no other eNB that satisfies an entering condition and maintains the entering condition, the UE may terminate the waiting timer T312.

In addition, the UE may periodically send a measurement report message to the eNB, even though the above events A1 to A6 do not occur. In this case, the technique for a waiting timer T312 may not be applied in an embodiment of the preset disclosure. In other words, the UE may not start the waiting timer T312 with respect to the periodic measurement report message.

Although both of the handover entering condition and the handover leaving condition for a handover event have been considered in an embodiment of the present disclosure, an optional operation, in which the handover leaving condition is not applied, is also possible. In this case, it is possible to prevent the waiting timer T312 from being started by the handover leaving condition.

Various embodiments of the present disclosure to configure the waiting timer T312 will be described below.

In an embodiment of the present disclosure, the length of the waiting timer T312 may be different depending on the type of the target cell for handover of the UE. For example, as shown in Table 14 below, if the target cell is a pico cell, a waiting timer T312_Pico, a length of which is configured as a relatively small value, may be used, and if the target cell is a macro cell, a waiting timer T312_Macro, a length of which is configured as a relatively large value, may be used (T312_Macro>T312_Pico).

TABLE 14

| Target Cell Type | T312 |
| --- | --- |
| Macro | T312_Macro |
| Pico | T312_Pico |

Information about the waiting timer T312_Pico or T312_Macro that has a different length depending on the type of the target cell may be transmitted to the UE by the eNB in a unicast manner, a broadcast manner, or another predetermined manner.

In addition, in an embodiment of the present disclosure, the length of the waiting timer T312 may be determined depending on (or in proportion to) the length of the handover timer TTT to which the ongoing handover is applied. For example, if the handover timer TTT has a large value, the waiting timer T312 may also have a large value, and if the handover timer TTT has a small value, the waiting timer T312 may also have a small value. It is also possible to classify the handover timer TTT for each interval, and then cause the waiting timer T312 to correspond to each interval. For example, as shown in Table 15 below, if the handover timers TTT are classified as the intervals of [0, 200] ms, [201, 400] ms, [401, 600] ms, [601, 800] ms, [801 and 1000] ms, then the waiting timers T312 may correspond to 50, 100, 150, 200 and 250 ms, in each interval.

TABLE 15

| TTT Range | T312 |
|---|---|
| 0-200 | 50 |
| 201-400 | 100 |
| 401-600 | 150 |
| 601-800 | 200 |
| 801-1000 | 250 |

In an embodiment of the present disclosure, it is also possible to configure the waiting timer T312 by scaling the handover timer TTT in the manner of (T312=a*TTT). Here, 'a' is a scaling parameter, and the eNB may transmit information about the scaling parameter 'a' to the UE in a unicast manner, a broadcast manner, or another predetermined manner.

In addition, in an embodiment of the present disclosure, it is also possible to configure the waiting timer T312 using the signal strength (e.g., Reference Signal Received Power (RSRP)) of the target cell to which the UE performs handover. For example, the waiting timer T312 may be configured such that if RSRP of the target cell is high, the waiting timer T312 may have a small value and if RSRP of the target cell is low, the waiting timer T312 may have a large value. In an embodiment of the present disclosure, it is also possible to configure the waiting timer T312 by scaling the RLF timer T310 in the manner of (T312=b*T310). The scaling parameter 'b' may be set as b=$RSRP_{target}$/constant. $RSRP_{target}$ is RSRP of the target cell. As for a value of the constant, its information may be transmitted to the UE by the eNB in a unicast manner or a broadcast manner, or a predetermined value may be used. In an embodiment of the present disclosure, RSRP of the target cell may be classified for each interval as shown in Table 16 below, and it is also possible to cause the waiting timer T312 to correspond to each interval.

TABLE 16

| RSRP Range | T312 |
|---|---|
| >-65 dbm | 50 |
| 65 dbm-75 dbm | 100 |
| 75 dbm-85 dbm | 150 |
| <85 dbm | 200 |

Further, in an embodiment of the present disclosure, it is possible to configure the waiting timer T312 using the ratio ($RSRP_{target}$/$RSRP_{serving}$) (hereinafter, referred to as an 'RSRP ratio') between RSRP of the target cell to which the UE performs handover, and RSRP of the current serving cell. For example, the waiting timer T312 may be configured such that if the RSRP ratio has a large value, the waiting timer T312 may have a small value, and if the RSRP ratio has a small value, the waiting timer T312 may have a large value. In an embodiment of the present disclosure, the UE may configure the waiting timer T312 that the UE itself will use, by multiplying the maximum waiting timer T312, a value of which is received from the eNB in a unicast manner or a broadcast manner, or a value of which is known in a predetermined manner, by the RSRP ratio.

Figure 18:
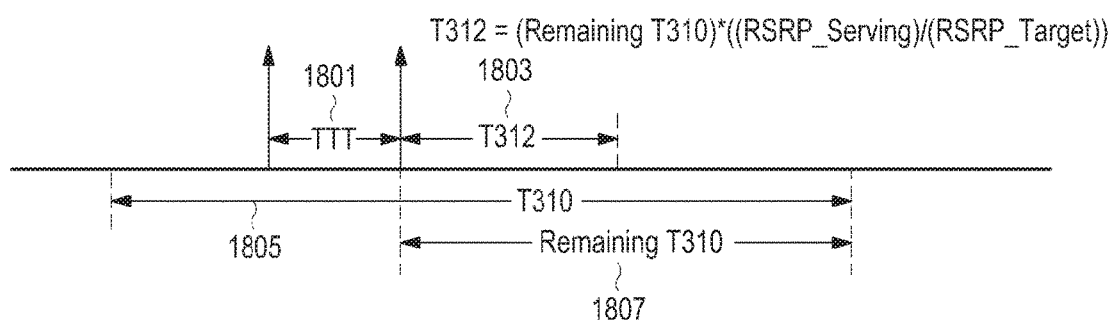
FIG. 18 illustrates a scheme for configuring a waiting timer T312 according to an embodiment of the present disclosure.

FIG. 18 illustrates a scheme for configuring a waiting timer T312 according to an embodiment of the present disclosure.

In an embodiment of the present disclosure, referring to FIG. 18, the UE may configure the waiting timer T312 1803 by multiplying the remaining RLF timer T310 1807 by the RSRP ratio. Referring to FIG. 18, reference numeral 1801 represents the handover timer TTT, and reference numeral 1805 represents the RLF timer T310. In an embodiment of the present disclosure, it is also possible to classify the RSRP ratio for each interval, and then cause the waiting timer T312 to correspond to each interval, as shown in Table 17 below.

TABLE 17

| (RSRP_Target)/(RSRP_Serving) Range | T312 |
|---|---|
| >2 | 50 |
| 1.75-2 | 100 |
| 1.5-1.75 | 150 |
| 1-1.5 | 200 |

Figure 19:
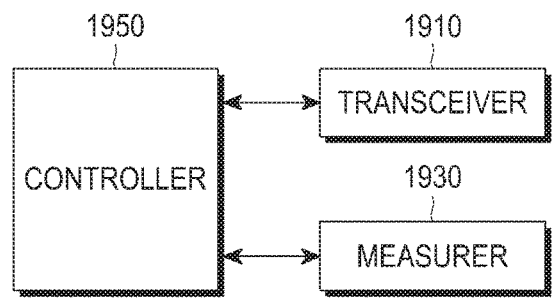
FIG. 19 illustrates a configuration of a UE controlling an operation of a waiting timer T312 according to an embodiment of the present disclosure.

FIG. 19 illustrates a configuration of a UE controlling an operation of a waiting timer T312 according to an embodiment of the present disclosure.

The UE in FIG. 19 may be implemented to include a transceiver 1910 for transmitting and receiving data to/from an eNB of each cell, a measurer 1930 for measuring the signal strength of each cell for cell search for handover, and a controller 1950 for controlling an operation of the waiting timer T312 by applying at least one of the schemes described in FIGS. 4 to 18.

The above-described embodiments of the present disclosure correspond to the solutions to various situations, which occur when the technique for a waiting timer T312 is used, which enables the waiting timer T312 to smoothly operate and to have a framework for optimizing the technique for a waiting timer T312, in the LTE system. In addition, various embodiments of the present disclosure may prevent the decrease in handover opportunities while reducing the service disconnection time if possible, which may occur when the UE experiences the handover and the RLF at the same time.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for identifying a radio link failure by a user equipment (UE) in a wireless communication system, the method comprising:
    receiving a first message including timer information of a first timer;
    starting the first timer if an entering condition related to an event is satisfied and a second timer related to the radio link failure is running; and
    stopping the first timer if a second message for a handover of the UE is received from a network.

2. The method of claim 1, further comprising:
    stopping the first timer if a channel condition for the UE is recovered and the second timer is stopped.

3. The method of claim 1, wherein the occurrence of the radio link failure is identified if the first timer expires.

4. The method of claim 1, wherein the starting of the first timer comprises:
if the second timer is running and the event satisfies a predetermined condition, identifying whether the first timer is supported in the event based on the timer information.

5. The method of claim 4, wherein if the first timer is not supported in the event, an occurrence of the radio link failure is identified based on an expiration of the second timer.

6. The method of claim 1, wherein the timer information includes a value of a time period of the first timer.

7. The method of claim 1, wherein the first message is a radio resource control (RRC) message.

8. The method of claim 1, wherein the timer information is configured for each event related to a measurement by the UE.

9. A user equipment (UE) in a wireless communication system, the UE comprising:
a transceiver; and
at least one processor coupled to the transceiver, wherein the at least one processor is configured to:
receive a first message including timer information of a first timer,
start the first timer if an entering condition related to an event is satisfied and a second timer related to a radio link failure is running, and
stop the first timer if a second message for a handover of the UE is received from a network.

10. The UE of claim 9, wherein the at least one processor is further configured to stop the first timer if a channel condition for the UE is recovered and the second timer is stopped.

11. The UE of claim 9, wherein the occurrence of the radio link failure is identified if the first timer expires.

12. The UE of claim 9, wherein the at least one processor is further configured to identify whether the first timer is supported in the event based on the timer information, if the second timer is running and the event satisfies a predetermined condition.

13. The UE of claim 12, wherein if the first timer is not supported in the event, an occurrence of the radio link failure is identified based on an expiration of the second timer.

14. The UE of claim 9 wherein the timer information includes a value of a time period of the first timer.

15. The UE of claim 9, wherein the first message is a radio resource control (RRC) message.

16. The UE of claim 9, wherein the timer information is configured for each event related to a measurement by the UE.

* * * * *